(12) United States Patent　(10) Patent No.: US 11,444,731 B2
Dou et al.　(45) Date of Patent: Sep. 13, 2022

(54) TRANSMISSION METHOD, TERMINAL, AND NETWORK DEVICE

(71) Applicant: HUAWEI TECHNOLOGIES CO., LTD., Guangdong (CN)

(72) Inventors: Shengyue Dou, Shanghai (CN); Ting Wang, Shanghai (CN); Yuanjie Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 67 days.

(21) Appl. No.: 16/678,298

(22) Filed: Nov. 8, 2019

(65) Prior Publication Data

US 2020/0076554 A1　Mar. 5, 2020

Related U.S. Application Data

(63) Continuation of application No. PCT/CN2018/085398, filed on May 3, 2018.

(30) Foreign Application Priority Data

May 12, 2017　(CN) .......................... 201710334272.9

(51) Int. Cl.
*H04W 72/04*　(2009.01)
*H04L 5/00*　(2006.01)

(52) U.S. Cl.
CPC .......... *H04L 5/0035* (2013.01); *H04L 5/0048* (2013.01); *H04W 72/042* (2013.01)

(58) Field of Classification Search
CPC ..... H04L 5/0035; H04L 5/0048; H04W 7/042
See application file for complete search history.

(56) References Cited

U.S. PATENT DOCUMENTS

2012/0202541 A1　8/2012　Koo et al.
2013/0223394 A1*　8/2013　Nishio .................. H04L 1/0029
370/329

(Continued)

FOREIGN PATENT DOCUMENTS

CN　102404854 A　4/2012
CN　102480344 A　5/2012
CN　104919724 A　9/2015
KR　101710391 B1　2/2017

OTHER PUBLICATIONS

Extended European Search Report issued in European Application No. 18798568.4 dated Mar. 16, 2020, 7 pages.

(Continued)

*Primary Examiner* — Chi Ho A Lee
(74) *Attorney, Agent, or Firm* — Fish & Richardson P.C.

(57) ABSTRACT

The present disclosure relates to transmission methods, terminals, and network devices. One example method includes receiving, by a terminal, a plurality of pieces of downlink control information (DCI), where the DCI includes at least first trigger information that is in a one-to-one correspondence with the DCI, and the first trigger information is used to indicate, to the terminal, at least one of a resource used by a first reference signal or sending processing of the first reference signal, determining, by the terminal, target first trigger information from a plurality of pieces of first trigger information, and performing, by the terminal and based on the target first trigger information, sending processing on the first reference signal.

21 Claims, 4 Drawing Sheets

(56) References Cited

U.S. PATENT DOCUMENTS

| | | | |
|---|---|---|---|
| 2014/0036809 A1* | 2/2014 | Xu | H04W 52/325 |
| | | | 370/329 |
| 2014/0192734 A1 | 7/2014 | Ng et al. | |
| 2015/0124673 A1* | 5/2015 | Ouchi | H04W 52/362 |
| | | | 370/311 |
| 2016/0374060 A1 | 12/2016 | Lim et al. | |
| 2017/0078830 A1 | 3/2017 | Wu et al. | |
| 2019/0074882 A1* | 3/2019 | Zhou | H04W 72/046 |
| 2019/0174466 A1* | 6/2019 | Zhang | H04W 72/042 |
| 2019/0207662 A1* | 7/2019 | Zhou | H04W 72/042 |
| 2019/0207731 A1* | 7/2019 | Park | H04W 72/042 |
| 2019/0215110 A1* | 7/2019 | Yang | H04W 76/27 |
| 2019/0215888 A1* | 7/2019 | Cirik | H04B 17/17 |
| 2019/0260456 A1* | 8/2019 | Zhou | H04L 1/18 |
| 2020/0336193 A1* | 10/2020 | Park | H04B 7/0408 |

OTHER PUBLICATIONS

Office Action issued in Indian Application No. 201927042449 dated Feb. 19, 2020, 7 pages.

3GPP TS 36.211 V14.2.0 (Mar. 2017), 3rd Generation Partnership Project;Technical Specification Group Radio Access Network, Evolved Universal Terrestrial Radio Access (E-UTRA), Physical channels and modulation(Release 14), Mar. 2017,196 pages.

3GPP TS 36.213 V14.2.0 (Mar. 2017), 3rd Generation Partnership Project, Technical Specification Group Radio Access Network, Evolved Universal Terrestrial Radio Access (E-UTRA), Physical layer procedures(Release 14), Mar. 2017, 454 pages.

Office Action issued in Chinese Application No. 201710334272.9 dated Apr. 26, 2019, 17 pages (With English Translation).

PCT International Search Report and Written Opinion in International Application No. PCT/CN2018/085,398, dated Jul. 18, 2018, 15 pages (With English Translation).

* cited by examiner

TRANSMISSION METHOD, TERMINAL, AND NETWORK DEVICE

CROSS-REFERENCE TO RELATED APPLICATION

This application is a continuation of International Application No. PCT/CN2018/085398, filed on May 3, 2018, which claims priority to Chinese Patent Application No. 201710334272.9, filed on May 12, 2017. The disclosures of the aforementioned applications are hereby incorporated by reference in their entireties.

TECHNICAL FIELD

This application relates to the field of communications, and in particular, to a transmission method, a terminal, and a network device.

BACKGROUND

Coordinated multi-point (coordinated multi-point transmission, CoMP) transmission is a method to resolve an inter-cell interference problem and increase a throughput of a cell-edge terminal. In the CoMP, for example, in a non-coherent joint transmission (non-coherent joint transmission, NCJT) scenario, each network device may independently send downlink control information (downlink control information, DCI). In other words, each network device performs scheduling independently. In this case, a terminal may receive a plurality of pieces of DCI. Each piece of DCI includes trigger information of a reference signal, for example, trigger information of an uplink sounding reference signal (sounding reference signal, SRS) or trigger information of a demodulation reference signal (demodulation reference signal, DMRS). Therefore, the terminal receives a plurality of pieces of trigger information of a reference signal of a same type. However, how a terminal processes, based on a plurality of pieces of trigger information of a reference signal of a same type, the reference signal of the type is not included in the prior art.

SUMMARY

This application provides a transmission method, a terminal, and a network device, so that a prior-art problem that after receiving a plurality of pieces of trigger information, a terminal has a different understanding of the trigger information can be resolved, and system performance can be improved.

According to a first aspect, a transmission method is provided, including: receiving, by a terminal, a plurality of pieces of downlink control information DCI, where the DCI includes at least first trigger information that is in a one-to-one correspondence with the DCI, and the first trigger information is used to indicate, to the terminal, a resource used by a first reference signal and/or sending processing of the first reference signal; determining, by the terminal, target first trigger information from a plurality of pieces of first trigger information; and performing, by the terminal based on the target first trigger information, sending processing on the first reference signal.

In this application, the performing, by the terminal based on the target first trigger information, sending processing on the first reference signal may specifically include any one of the following:

the terminal sends the first reference signal, the terminal does not send the first reference signal, or the terminal sends the first reference signal based on a resource that is used by the first reference signal and that is indicated by the target first trigger information.

In a case in which the first trigger information only instructs the terminal to send the first reference signal, the terminal may send the first reference signal based on a resource or a parameter that is configured for the terminal by using higher layer RRC signaling and that is used when the first reference signal is sent.

Optionally, the plurality of pieces of first trigger information are the same.

Further, resources used by first reference signals indicated by the plurality of pieces of first trigger information are the same.

According to the transmission method in this embodiment of this application, in a case in which the plurality of pieces of first trigger information are received, the terminal can determine the target first trigger information from the plurality of pieces of first trigger information, and further perform sending processing on the first reference signal based on the target first trigger information. Therefore, a prior-art problem that after receiving a plurality of pieces of first trigger information, a terminal has a different understanding of the first trigger information, and does not know how to process a first reference signal can be resolved, and system performance can be improved.

In a possible implementation, the determining, by the terminal, target first trigger information from a plurality of pieces of first trigger information includes: determining, by the terminal as the target first trigger information, one of the plurality of pieces of first trigger information that instructs the terminal to send the first reference signal.

Optionally, the one piece of first trigger information that instructs the terminal to send the first reference signal is sent by a serving network device of the terminal.

In a possible implementation, the determining, by the terminal, target first trigger information from a plurality of pieces of first trigger information includes:

determining, by the terminal, the first trigger information based on at least one of resource locations of the plurality of pieces of DCI, aggregation levels of the plurality of pieces of DCI, scrambling modes of the plurality of pieces of DCI, and first indication information included in the plurality of pieces of DCI.

Optionally, the terminal determines first trigger information included in target DCI as the target first trigger information, where the target DCI meets at least one of the following conditions; the target DCI is carried at a target resource location, an aggregation level of the target DCI is a target aggregation level, a scrambling mode of the target DCI is a target scrambling mode, and first indication information included in the target DCI is target first indication information.

In a possible implementation, the determining, by the terminal, target first trigger information from a plurality of pieces of first trigger information includes: determining, by the terminal, target DCI from the plurality of pieces of DCI, where the target DCI is determined in a predefined manner or determined through interaction between network devices; and determining, by the terminal, first trigger information included in the target DCI as the target first trigger information.

Optionally, the target DCI is sent by a serving network device of the terminal.

In a possible implementation, the determining, by the terminal, target DCI from the plurality of pieces of DCI includes determining, by the terminal, DCI that meets at least one of the following conditions as the target DCI:

the DCI is carried at a target resource location, an aggregation level of the DCI is a target aggregation level, a scrambling mode of the DCI is a target scrambling mode, and first indication information included in the DCI is target first indication information.

In a possible implementation, the resource location is any one of the following: a search space, a candidate control channel set, and a control resource set.

In a possible implementation, the resource used by the first reference signal includes at least one of a first reference signal sequence used by the first reference signal, a time domain resource used by the first reference signal, a frequency domain resource used by the first reference signal, a numerology used by the first reference signal, an antenna port resource used by the first reference signal, a precoding matrix used by the first reference signal sequence, and a comb structure used by the first reference signal sequence.

According to a second aspect, a transmission method is provided, including: determining, by a network device, at least one piece of downlink control information DCI in a plurality of pieces of DCI, where the DCI includes at least first trigger information, and the first trigger information is used to indicate, to a terminal, a resource used by a first reference signal and/or sending processing of the first reference signal; the plurality of pieces of DCI are used by the terminal to determine target first trigger information from a plurality of pieces of first trigger information, the target first trigger information is used by the terminal to determine sending processing of the first reference signal, and the plurality of pieces of DCI are in a one-to-one correspondence with the plurality of pieces of first trigger information; and sending, by the network device, the at least one piece of DCI to the terminal.

Optionally, the plurality of pieces of first trigger information are the same.

Further, resources used by first reference signals indicated by the plurality of pieces of first trigger information are the same.

Optionally, the at least one piece of DCI is one or more pieces of target DCI.

Further, the network device is a serving network device of the terminal.

According to the transmission method in this embodiment of this application, in a case in which the plurality of pieces of first trigger information are received, the terminal can determine the target first trigger information from the plurality of pieces of first trigger information, and further perform sending processing on the first reference signal based on the target first trigger information. Therefore, a prior-art problem that after receiving a plurality of pieces of first trigger information, a terminal has a different understanding of the first trigger information, and does not know how to process a first reference signal can be resolved, and system performance can be improved.

In a possible implementation, the at least one piece of DCI is determined in a predefined manner or in a manner of interaction with another network device serving the terminal.

In a possible implementation, the DCI further includes first indication information, and the first indication information is used to indicate that the network device is a serving network device or a coordinated network device of the terminal.

In a possible implementation, the network device is the coordinated network device of the terminal, and at least one piece of first trigger information included in the at least one piece of DCI is used to instruct the terminal not to send the first reference signal.

According to a third aspect, a terminal is provided. The terminal is configured to perform the method in the first aspect or any possible implementation of the first aspect. Specifically, the terminal includes units configured to perform the method in the first aspect or any possible implementation of the first aspect.

According to a fourth aspect, a network device is provided. The network device is configured to perform the method in the second aspect or any possible implementation of the second aspect. Specifically, the network device includes units configured to perform the method in the second aspect or any possible implementation of the second aspect.

According to a fifth aspect, a terminal is provided, including a transceiver, a processor, and a memory. The processor is configured to control the transceiver to receive and send a signal. The memory is configured to store a computer program. The processor is configured to invoke the computer program from the memory and run the computer program, so that the terminal performs the method in any one of the first aspect or the possible implementations of the first aspect.

According to a sixth aspect, a network device is provided, including a transceiver, a processor, and a memory. The processor is configured to control the transceiver to receive and send a signal. The memory is configured to store a computer program. The processor is configured to invoke the computer program from the memory and run the computer program, so that the network device performs the method in any one of the second aspect or the possible implementations of the second aspect.

According to a seventh aspect, a computer program product is provided, where the computer program product includes computer program code, and when the computer program code is run by a terminal, the terminal is enabled to perform the method in any one of the first aspect or the possible implementations of the first aspect.

According to an eighth aspect, a computer program product is provided, where the computer program product includes computer program code, and when the computer program code is run by a terminal device, the network device is enabled to perform the method in any one of the second aspect or the possible implementations of the second aspect.

According to a ninth aspect, a computer readable medium is provided. The computer readable medium stores program code, and the program code includes an instruction used to perform the method in any one of the first aspect or the possible implementations of the first aspect.

According to a tenth aspect, a computer readable medium is provided. The computer readable medium stores program code, and the program code includes an instruction used to perform the method in any one of the second aspect or the possible implementations of the second aspect.

DESCRIPTION OF EMBODIMENTS

The following describes the technical solutions in this application with reference to the accompanying drawings.

Figure 1:
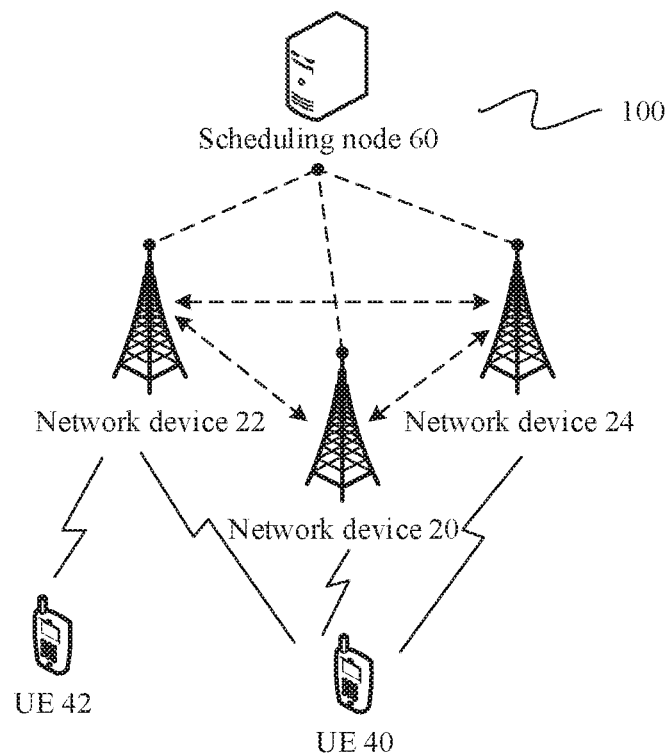
FIG. 1 is a schematic diagram of a communications system according to an embodiment of this application.

To resolve a problem that a terminal does not know how to perform processing when receiving a plurality of pieces of trigger information of a reference signal of a same type in the prior art, an embodiment of this application provides a transmission method based on a communications system shown in FIG. 1, so that sending processing of reference signals of a same type can be performed based on a plurality of pieces of trigger information that are of the reference signals of the type and that are received by the terminal.

As shown in FIG. 1, an embodiment of this application provides a communications system 100. The communications system 100 includes at least two network devices and at least one terminal. A terminal accesses a network device by using a wireless interface for communication, or may perform communication with another terminal, for example, communication in a device-to-device (device-to-device, D2D) or machine-to-machine (machine-to-machine. M2M) scenario. A network device may communicate with a terminal, or may communicate with another network device. For example, a macro base station communicates with an access point. In the communications system 100, one network device may provide a communication service for one or more terminals. For example, a network device 22 may provide a communication service for a terminal 42. Alternatively, one terminal may communicate with a plurality of network devices on a same carrier. For example, a terminal 40 may receive, on a same carrier and in a same time period, downlink data transmitted by a network device 20, the network device 22, and a network device 24. In other words, at least two network devices transmit downlink data to the terminal by using a CoMP technology. The CoMP technology may be implemented by using a technology such as space diversity and/or space multiplexing, and this is not limited in this application.

In a scenario in which the CoMP technology is applied, a network device that provides a service such as a radio resource control (radio resource control, RRC) connection, non-access stratum (non-access stratum, NAS) mobility management, and security input for a terminal by using a radio air interface protocol is defined as a serving network device of the terminal. One or more other network devices that send downlink data to the terminal are defined as coordinated network devices of the terminal. It should be understood that the serving network device may also send downlink data to the terminal. Communication may be performed between the serving network device and the coordinated network device, and may be performed between a plurality of coordinated network devices. For example, transmission of a control message is performed. In the communications system 100 provided in this embodiment of this application, a plurality of network devices that transmit downlink data to the terminal by using the CoMP technology may be different transmission points of a same device, for example, a plurality of radio frequency units (radio frequency unit, RU) of a distributed base station; may be a plurality of independent network devices, for example, a plurality of base stations; or may be a combination of the foregoing two cases. This is not limited in this application.

Optionally, the plurality of network devices may be controlled and/or scheduled by a scheduling node. For example, in FIG. 1, the network device 20, the network device 22, and the network device 24 may all be controlled and/or scheduled by a scheduling node 60, and information such as a control message may be sent by the scheduling node to the plurality of network devices. Optionally, a function of the scheduling node may also be implemented by one or more network devices. For example, the network device 20 may implement the function as the scheduling node, to send a control message to the network device 22 and/or the network device 24. It should be noted that a scheduling node may be an independent physical device (for example, the scheduling node 60 shown in FIG. 1), or may be a software and/or hardware function module integrated into a network device. For example, in FIG. 1, the network device 20 may implement the function as the scheduling node. In this case, the network device 20 may schedule and manage resources together based on information sent by another network device and information obtained and maintained by the network device 20. Certainly, the function of the scheduling node may alternatively be implemented by another network device, and this is not limited in this application.

It should be understood that the communications system 100 may include various communications systems, for example, a global system for mobile communications (global system of mobile communication. GSM), a code division multiple access (code division multiple access. CDMA) system, a wideband code division multiple access (wideband code division multiple access, WCDMA) system, a general packet radio service (general packet radio service, GPRS) system, a long term evolution (long term evolution, LTE) system, a long term evolution-advanced (long term evolution-advanced, LTE-A) system, a universal mobile telecommunications system (universal mobile telecommunications system. UMTS), and a 5G (or referred to as a new radio access (new radio access, NR)) technology system. The technical solutions provided in the embodiments of this application are applicable to a communications system to which the CoMP technology is applied. A system architecture and a service scenario described in this embodiment of this application are intended to describe the technical solutions in the embodiments of this application more clearly, and do not constitute a limitation to the technical solutions provided in the embodiments of this application. A person of ordinary skill in the art may know that, with evolution of network architectures and emergence of new service scenarios, the technical solutions provided in the embodiments of this application are also applicable to a similar technical issue.

The network device in this application may be a cell (cell), a node (for example, a base station or a relay node) corresponding to the cell, a remote radio head (remote radio head, RRH), a remote radio unit (remote radio unit, RRU), an antenna port (antenna port), or the like, which may be collectively referred to as a transmission point (Transmission point, TP). The base station may be a base transceiver station (base transceiver station, BTS) in a GSM system or a CDMA system, a NodeB (NodeB) in a WCDMA system, an evolved NodeB (evolved Node B, eNB or eNodeB) in an LTE system, a transmission reception point (transmission reception point, TRP) in an NR system, a TP, an antenna panel or a group of antenna panels (including a plurality of antenna panels) of a gNB in a 5G system, or the like. This is not particularly limited in the embodiments of this application.

The network device may be determined based on a cell identity, a base station identification (identification, ID), an antenna port index or an antenna port number, a pilot information identifier, or the like.

In addition, the network device in the embodiments of this application may be a network device that uses a CU-DU architecture. The network device that implements methods in embodiments of this application, for example, a serving network device or a coordinated network device, may be a centralized unit (centralized unit, CU), or may be a distributed unit (distributed unit, DU). The CU may also be referred to as a central unit (central unit) or a control unit (control unit).

The terminal in this application may be mobile or fixed. The terminal may communicate with one or more core networks (core network) by using a radio access network (radio access network, RAN). The terminal may be referred to as a terminal device, an access terminal, user equipment (user equipment, UE), a subscriber unit, a subscriber station, a mobile station, a mobile console, a remote station, a remote terminal, a mobile device, a user terminal, a wireless communications device, a user agent, or a user apparatus. The terminal may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, or the like.

It should be noted that the communications system 100 shown in FIG. 1 is merely a schematic diagram of a system applicable to this application. The communications system 100 shown in FIG. 1 should not be construed as any limitation on a communications system that can be applied to this application. In the communications system 100 shown in FIG. 1, a quantity of included network devices and a structure of the network device, a quantity and distribution of different network devices and a quantity and distribution of terminals that communicate with the network devices, a quantity of network devices that send data to a same terminal in a same time period and on a same carrier by using the CoMP technology, and a quantity and types of terminals are merely examples. The embodiments of this application are not limited thereto. In addition, as shown in FIG. 1, the communications system 100 includes the network device 20, the network device 22, the network device 24, and a plurality of terminals, but the communications system 100 may include, but is not limited to, the network devices and the terminals, and may further include, for example, a core network device or a device configured to carry a virtualized network function. This is obvious to a person of ordinary skill in the art and is not described herein in detail.

To describe the solutions in this application more clearly, a problem existing in the prior art, to be specific, a technical problem to be actually resolved in this application, is first briefly described with reference to a communications system 200 shown in FIG. 2.

In the prior art, only one network device (for example, a network device 110) schedules a terminal 130 by using downlink control information (downlink control information, DCI) (for example, first downlink control information) at a same moment. The first downlink control information may include trigger information of a reference signal, to trigger the reference signal. The trigger information of the reference signal instructs the terminal to send the reference signal, or instructs the terminal not to send the reference signal, or instructs the terminal to send the reference signal on a specific resource. For ease of understanding and description, the following uses an example in which the reference signal is an SRS and the trigger information is SRS trigger information for description.

In an existing LTE protocol, a terminal sends an SRS based on the following two trigger mechanisms:

trigger type 0 (trigger type 0): triggering is performed by using higher layer signaling, and trigger type 1 (trigger type 1): triggering is performed by using DCI formats (formats) 0/4/1A that are used for frequency division duplex (frequency division duplex, FDD) and time division duplex (time division duplex, TDD), and DCI formats 2B/2C/2D that are used for time division duplex (time division duplex, TDD).

The trigger type 0 corresponds to periodic SRS transmission, and the periodic SRS transmission is triggered by using higher layer RRC signaling. The trigger type 1 corresponds to aperiodic SRS transmission, and the aperiodic SRS transmission is triggered by using DCI on a physical downlink control channel (physical downlink control channel, PDCCH). Time domain SRS parameters, frequency domain SRS parameters, and code domain SRS parameters (namely. SRS resources in NR) of the trigger type 0 and the trigger type 1 are semi-statically configured by using higher layer RRC signaling.

In the prior art, for an aperiodic SRS (corresponding to the trigger type 1), one piece of DCI format signaling can only trigger one terminal to send an SRS once.

TABLE 1

Table of an SRS request type for the
DCI format 4 of the trigger type 1

| Value of an SRS request field (Value of SRS request field) | Description (Description) |
|---|---|
| '00' | Not triggering an SRS of trigger type 1 (No type 1 SRS trigger) |
| '01' | A first set of SRS parameters configured by RRC (The 1$^{st}$ SRS parameter set configured by RRC) |
| '10' | A second set of SRS parameters configured by RRC (The 2$^{nd}$ SRS parameter set configured by RRC) |
| '11' | A third set of SRS parameters configured by RRC (The 3$^{rd}$ SRS parameter set configured by RRC) |

The value of the SRS request field represents trigger information of an SRS (or referred to as SRS trigger information). For a terminal, three sets of SRS parameters (to be specific, the first set of SRS parameters, the second set of SRS parameters, and the third set of SRS parameters) and one non-trigger state may be configured for the terminal by using higher layer RRC signaling, and one of the three sets of SRS parameters is triggered by using "2 bits" in the DCI format 4 each time, as shown in Table 1. Alternatively, one set of SRS parameters is configured for each terminal by using higher layer RRC signaling, and the set of SRS parameters is triggered by using "1 bit" in the DCI formats 0/1 A/2B/2C/2D.

The DCI format 4 is used as an example. When SRS trigger information (namely, "2 bits" in the DCI format 4) is '00', it indicates that the SRS trigger information is in the non-trigger state. In this case, the terminal does not send an SRS. When SRS trigger information is '01', the terminal needs to send an SRS on a first set of SRS resources (including a time domain resource, a frequency domain resource, and a code domain resource) based on an indication of the first set of SRS parameters. When SRS trigger information is '10', the terminal needs to send an SRS on a second set of SRS resources based on an indication of the second set of SRS parameters. When SRS trigger information is '11', the terminal needs to send an SRS on a third set of SRS resources (including a time domain resource, a frequency domain resource, and a code domain resource) based on an indication of the third set of SRS parameters.

The DCI formats 0/1A/2B/2C/2D are used as an example. When SRS trigger information (namely, "1 bit" in the DCI formats 0/1A/2B/2C/2D) is '0', it indicates that the SRS trigger information is in the non-trigger state. In this case, the terminal does not send an SRS. When SRS trigger information is '1', the terminal needs to send an SRS on a SRS resource (including a time domain resource, a frequency domain resource, and a code domain resource) based on an indication of a set of SRS parameter configured by using higher layer RRC signaling.

In a CoMP (for example, NCJT) scenario, to avoid exchanging of information such as channel state information (Channel State Information, CSI) and scheduling information between a first network device 110 and a second network device 120 through an X2 interface in a non-ideal backhaul (backhaul) case, separate scheduling may be considered to be performed in a manner in which the first network device 110 and the second network device 120 send downlink control information separately. It should be understood that the first network device may be a serving network device of the terminal 130, and the second network device may be a coordinated network device of the terminal 130; or the first network device may be the coordinated network device of the terminal 130, and the second network device may be the serving network device of the terminal 130. For ease of description and understanding, in the following description, that the first network device is the serving network device of the terminal 130 and the second network device is the coordinated network device of the terminal 130 is used as an example for description.

When the first network device 110 and the second network device 120 perform scheduling separately, for example, the first network device may send first DCI, and the second network device may send second DCI. In this case, the terminal 130 may receive both the first DCI and the second DCI on a same carrier. Each piece of DCI includes SRS trigger information; therefore, the terminal 130 may receive a plurality of pieces of SRS trigger information. For example, the first DCI includes first SRS trigger information, and the second DCI includes second SRS trigger information. The terminal 130 may receive both the first SRS trigger information and the second SRS trigger information. The first SRS trigger information and the second SRS trigger information may be the same or may be different. For example, the first SRS trigger information may be '01', and the second SRS trigger information may be '11'. In this case, how the terminal 130 performs, based on the first SRS trigger information and the second SRS trigger information. SRS sending processing of whether to send an SRS, not to send an SRS, or to send an SRS on a specific resource becomes a problem to be urgently resolved.

Therefore, in this application, a transmission method is provided to resolve a problem of how a terminal processes a reference signal of a same type based on a plurality of pieces of trigger information of the reference signal of the type. The following describes the technical solutions of the present invention in detail by using specific embodiments. The following specific embodiments may be combined with each other, and a same or similar concept or process may not be described repeatedly in some embodiments.

First, the following explains general concepts or definitions in the embodiments of this application. It should be noted that, some English abbreviations in this specification are used to describe the embodiments of this application by using an LTE system as an example, and may change with network evolution. For specific evolution, refer to descriptions in a corresponding standard.

1. Numerology (Numerology)

The numerology is a set of parameters used in a communications system, including a subcarrier spacing, a symbol length, a CP length, and the like. In LTE/LTE-A, the subcarrier spacing (subcarrier spacing, SCS) is fixed at 15 kHz. In NR, the SCS is set to $15*(2^n)$ kHz, where n can be a negative number. To be specific, the SCS may be set to 3.75 kHz, 7.5 kHz, 15 kHz, 30 kHz, 60 kHz, 120 kHz, or the like. Values of the SCS directly affect a length of a symbol in time domain (based on FFT basic principle).

2. Search Space (Search Space)

The search space may include a common search space (common search space) and a UE-specific search space (UE-specific search space). The common search space is used to transmit cell-level common information. For example, the cell-level common information may include control information related to paging (paging), a random access response (random access response, RAR), a broadcast control channel (broadcast control channel, BCCH), and the like. The UE-specific search space is used to transmit terminal-level (or UE-level) information. For example, the terminal-level information may include control information related to a downlink shared channel (downlink shared channel, DL-SCH), an uplink shared channel (uplink shared channel, UL-SCH), and the like.

It should be understood that the common search space and the UE-specific search space are two types of search spaces defined in an LTE protocol. In this application, the UE-specific search space is used as an example for description, but this should not be construed as any limitation on this application. A possibility of redividing or redefining a search space is not excluded in this application. Any resource used to transmit terminal-level information may be defined as the UE-specific search space in the embodiments of this application.

A search space is defined for a specific CCE aggregation level. One terminal device may have a plurality of search spaces, and CCEs in each search space may be contiguously distributed. The terminal device needs to monitor a group of PDCCHs. The group of monitored PDCCHs may be referred to as a "candidate control channel set (candidate control channel set)" or "control channel candidates (PDCCH candidates)".

Table 2 shows a correspondence between an aggregation level L, a quantity $N_{CCE,k}$ of available CCEs (or referred to as a search space size), and a quantity $M^{(L)}$ of PDCCH candidates that need to be monitored in a given search space.

TABLE 2

| | Search space $S_k^{(L)}$ | | |
|---|---|---|---|
| Type | Aggregation level L (in CCEs) | Size (in CCEs) | Quantity $M^{(L)}$ of PDCCH candidates |
| UE-specific | 1 | 6 | 6 |
| | 2 | 12 | 6 |
| | 4 | 8 | 2 |
| | 8 | 16 | 2 |

It can be learned that different aggregation levels correspond to different search space sizes and different quantities of PDCCH candidates. Further, a search space size M= $M^{(L)}$*L. In other words, a quantity of CCEs included in a search space is a product of an aggregation level and a quantity of PDCCH candidates.

It should be understood that, Table 2 is merely for ease of understanding, and describes the correspondence between parameters with reference to an aggregation level L, a quantity $M^{(L)}$ of PDCCH candidates that need to be monitored in a given search space, and a search space size $N_{CCE,k}$ that are defined in an LTE protocol. However, this should not be construed as any limitation on the embodiments of the present invention. In addition, neither a possibility that the correspondence between an aggregation level L, a quantity $M^{(L)}$ of PDCCH candidates that need to be monitored in a given search space, and a search space size $N_{CCE,k}$ is redefined in a future protocol, nor a possibility of defining more parameters is excluded in this application.

3. Aggregation Level (Aggregation Level, AL)

The aggregation level indicates a quantity of contiguous CCEs occupied on a PDCCH. A CCE includes nine resource element groups (resource element group, REG). An REG includes four resource elements (resource element, RE) that are contiguous in frequency domain and that are of a non-reference signal. In other words, a CCE includes 36 REs.

4. Control Resource Set (Control Resource Set)

A control channel may be divided into a plurality of control resource sets, and each control resource set is a set of REGs. A terminal device may monitor a PDCCH on one or more control resource sets.

In the embodiments of the present invention, for a network device, a control resource set may be understood as a resource occupied for sending a control channel, e.g. PDCCH. For a terminal device, each PDCCH search space of the terminal device belongs to the control resource set. In other words, the network device may determine, from the control resource set, a resource used for sending a PDCCH, and the terminal device may determine a PDCCH search space from the control resource set. The control resource set may include a time-frequency resource. For example, the control resource set may be a segment of bandwidth, or one or more subbands in frequency domain; may be a quantity of time units in time domain, for example, a quantity of symbols in a subframe, a slot, or a mini-slot; and may be contiguous or discontiguous resource units in time-frequency domain, for example, contiguous resource blocks (resource block, RB) or discontiguous RBs.

It should be understood that specific content of the frequency domain resource, time domain resource, and time-frequency domain resource illustrated above is merely an example for description, and should not be construed as any limitation on the embodiments of the present invention. For example, the RB may be defined as a resource defined in an existing LTE protocol, or may be defined as a resource defined in a future protocol, or may be replaced with another name. For another example, the time unit may be a subframe; or may be a slot (slot); or may be a radio frame, a mini-slot (mini-slot or sub-slot), a plurality of aggregated slots, a plurality of aggregated subframes, a symbol, or the like; or may even be a transmission time interval (transmission time interval, TTI). This is not specifically limited in the embodiments of this application.

CoMP in this application includes but is not limited to joint transmission JT. The JT includes coherent JT and non-coherent JT (non-coherent joint transmission, NCJT). A difference between the coherent JT and the NCJT lies in that beamforming is separately performed on data streams from a plurality of coordinated TPs in the NCJT, and beamforming is jointly performed on data streams from a plurality of coordinated TPs in the coherent JT.

The term "and/or" in this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In addition, it may be understood that the terms "first" and "second" in this application are used only for ease of description and understanding, and should not be construed as any limitation on the embodiments of this application.

Figure 3:
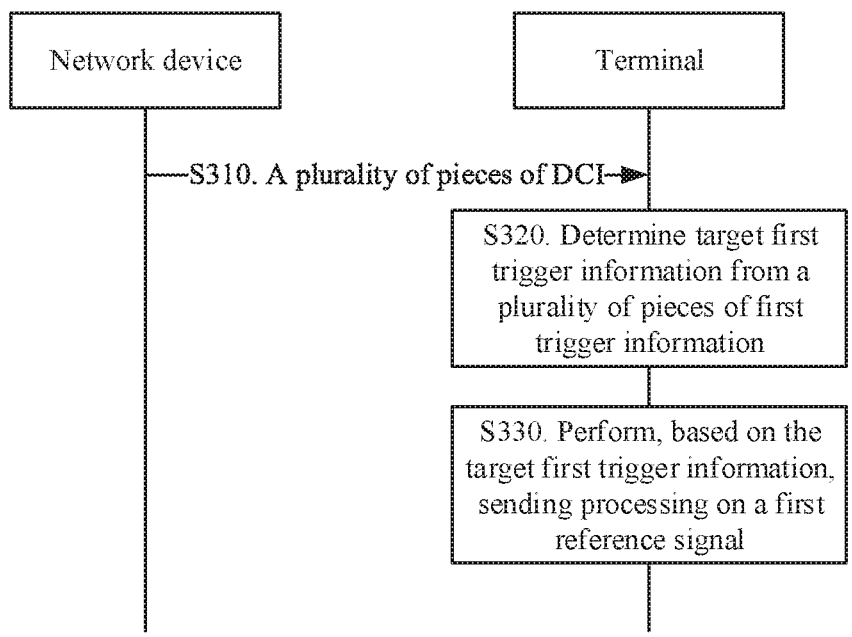
FIG. 3 is a schematic flowchart of a transmission method according to an embodiment of this application.

With reference to FIG. 3, the following describes a transmission method according to an embodiment of this application in detail.

It should be understood that FIG. 3 is a schematic flowchart of a transmission method according to an embodiment of this application, and shows detailed communication steps or operations of the method. However, these steps or operations are merely examples. In this embodiment of this application, another operation or variations of the operations in FIG. 3 may be performed. In addition, the steps in FIG. 3 may be separately performed in a sequence different from that shown in FIG. 3, and possibly, not all the operations in FIG. 3 need to be performed.

FIG. 3 is a schematic flowchart of a transmission method, described from a perspective of device interaction, according to an embodiment of this application.

S310. A terminal receives a plurality of pieces of DCI sent by at least one network device.

For ease of understanding and distinguishing, the plurality of pieces of DCI received by the terminal are denoted below as DCI #1 to DCI #N, where N≥1. Each piece of DCI includes trigger information of at least one type of reference signal. In other words, each piece of DCI may include trigger information of one type of reference signal, or may include trigger information of a plurality of types of reference signals. This is not limited in this application. For ease of description and understanding, trigger information of at least one type of reference signal included in any piece of DCI in the DCI #1 to the DCI #N is referred to as first trigger information below. The at least one type of reference signal, namely, a reference signal corresponding to the first trigger information is referred to as a first reference signal. Correspondingly, a plurality of pieces of first trigger information included in the plurality of pieces of DCI are denoted as first trigger information #1 to first trigger information #N. The first trigger information #1 to the first trigger information #N are in a one-to-one correspondence with the DCI #1 to the DCI #N. For example, the first trigger information #1 may be first trigger information included in the DCI #1, and the first trigger information #2 may be first trigger information included in the DCI #2. By analogy, the first trigger information #N may be first trigger information included in the DCI #N. To avoid repetition, detailed descriptions thereof are omitted herein.

It should be understood that the plurality of pieces of DCI may be DL grants (namely, DCL grants) all used to schedule a downlink PDSCH (namely, DCL grants), or may be UL grants used to schedule an uplink PUSCH. Alternatively, the plurality of pieces of DCI may include both a DL grant used to schedule a downlink PDSCH and a UL grant used to schedule an uplink PUSCH. This is not limited in this embodiment of this application.

The first trigger information is used to indicate, to the terminal, a resource used by the first reference signal and/or sending processing of the first reference signal. Specifically, the sending processing performed by the terminal on the first reference signal may be not sending a first reference signal or sending a first reference signal. When the first trigger information instructs the terminal to send a first reference signal, the first trigger information may further indicate a resource used by the terminal to send the first reference signal. In other words, the first trigger information may further indicate one or more groups of parameters, and the one or more groups of parameters are used to indicate one or more groups of resources. One set of parameters may indicate one group of resources, or may indicate a plurality of groups of resources. This is not limited in this application. In conclusion, the first trigger information may instruct the terminal not to send a first reference signal, or send a first reference signal, or send a first reference signal based on specific resources (including one or more groups of resources) or specific parameters (including one or more groups of parameters). Correspondingly, the terminal may determine, based on the first trigger information, that the first reference signal does not need to be sent, or the first reference signal needs to be sent, or the first reference signal needs to be sent based on the resource indicated by the first trigger information. It should be noted that, if the first trigger information only instructs the terminal to send a first reference signal, but does not indicate, to the terminal, a resource used for sending the first reference signal, the terminal may determine, based on other information, for example, based on a parameter that is configured for the terminal by using higher layer RRC signaling and that is used for sending the first reference signal, the resource used for sending the first reference signal.

It should be understood that the first trigger information may indicate the one or more groups of parameters by using indexes of the one or more groups of parameters. Alternatively, the first trigger information may indicate the one or more groups of resources by using indexes of the one or more groups of resources.

Optionally, the first trigger information may be SRS trigger information, DMRS trigger information, or CSI-RS trigger information. Correspondingly, the first reference signal may be an SRS, a DMRS, or a CSI-RS. It should be understood that the first reference signal may also be a reference signal of another type different from the reference signals illustrated above. A type of the first reference signal is not specifically limited in this embodiment of this application, and correspondingly, the first trigger information is not specifically limited.

Optionally, any group of resources in resources used by the first reference signal may include at least one of the following: a first reference signal sequence, a time domain resource, a frequency domain resource, a numerology (numerology), an antenna port resource, a precoding matrix used by the first reference signal sequence, and a comb structure used by the first reference signal sequence. For example, the first reference signal is an SRS, a group of resources used by the SRS may include one or more of the following: an SRS sequence, a time domain resource, a frequency domain resource, a numerology, an antenna port resource, a precoding matrix used by the SRS sequence, and a comb structure used by the SRS sequence. Herein, the group of resources used by the SRS may be referred to as SRS resources (resource). It should be understood that the SRS resource may be the same as or different from a resource configured for an SRS in the prior art (for example, in LTE), and this is not specifically limited in this embodiment of this application. When the SRS resource is the same as an SRS resource configured by using RRC in the prior art, reference may be made to the prior art for details about the SRS sequence, the time domain resource, the frequency domain resource, and the comb structure. For brevity, details are not described herein. It should be further understood that the antenna port resource herein may refer to an antenna port (port) for sending the first reference signal.

It should be understood that each piece of DCI may further include other information in addition to the first trigger information. For example, each piece of DCI may further include trigger information of one or more types of reference signals in addition to the first reference signal, and the trigger information of the one or more types of reference signals are in a one-to-one correspondence with the one or more types of reference signals. For example, each piece of DCI may further include second trigger information. The second trigger information is used to indicate, to the terminal, a resource used by the second reference signal and/or sending processing of the second reference signal. The sending processing performed by the terminal on the second reference signal based on the second trigger information may be specifically stipulated in a system or a protocol, or preset in the system. The sending processing performed by the terminal on the second reference signal may be similar to or different from the sending processing performed by the terminal on the first reference signal. This is not specifically limited in this embodiment of this application.

Optionally, the first trigger information #1 to the first trigger information #N may be all the same, may be different from each other, or may be partially the same. This is not limited in this embodiment of this application. Correspondingly, resources indicated by the first trigger information #1 to the first trigger information #N may be all the same, may be different from each other, or may be partially the same. This is not limited in this embodiment of this application.

Optionally, in an embodiment of this application, the at least one network device in S310 may be specifically a serving network device of the terminal. In other words, the serving network device of the terminal sends the DCI #1 to the DCI #N to the terminal, and correspondingly, the terminal receives the DCI #1 to the DCI #N. With reference to FIG. 2, for example, the serving network device of the terminal 130, namely, the first network device 110, may send the DCI #1 to the DCI #N to the terminal 130. Correspondingly, the terminal 130 receives the DCI #1 to the DCI #N sent by the first network device 110.

Optionally, in an embodiment of this application, the at least one network device in S310 may be specifically a coordinated network device of the terminal. In other words, the coordinated network device of the terminal sends the DCI #1 to the DCI #N to the terminal, and correspondingly, the terminal receives the DCI #1 to the DCI #N. Further, the DCI #1 to the DCI #N may be sent by one coordinated network device of the terminal. Alternatively, the DCI #1 to the DCI #N may be sent by a plurality of coordinated network devices of the terminal. When the DCI #1 to the DCI #N are sent by a plurality of coordinated network devices, one coordinated network device may send one piece of DCI, or one coordinated network device may send a plurality of pieces of DCI. This is not specifically limited in this application. With reference to FIG. 2, for example, the coordinated network device of the terminal 130, namely, the second network device 120, may send the DCI #1 to the DCI #N to the terminal 130. Correspondingly, the terminal 130 receives the DCI #1 to the DCI #N sent by the second network device 120.

Optionally, in another embodiment of this application, the at least one network device in S310 may include a serving network device of the terminal and a coordinated network device of the terminal. Further, the DCI #1 to the DCI #N are in a one-to-one correspondence with the at least one network device. In other words, the serving network device of the terminal and the coordinated network device of the terminal separately send one piece of DCI to the terminal. With reference to FIG. 2, for example, the serving network device 110 and the coordinated network device 120 of the terminal 130 may separately send first DCI (namely. DCI #1) and second DCI (namely. DCI #2) to the terminal. Correspondingly, the terminal 120 may receive both the DCI #1 and the DCI #2. In this case, the serving network device of the terminal and the coordinated network device of the terminal may separately send corresponding DCI according to a stipulation in a protocol or a predefined rule, or may first perform interaction through an interface (for example, an X2 interface) between network devices and then send DCI through negotiation. In an interactive negotiation manner, for example, the serving network device of the terminal and the coordinated network device of the terminal may send same first trigger information. For another example, first trigger information sent by the serving network device of the terminal can trigger the terminal to send/not to send a first reference signal, but the coordinated network device of the terminal can only send first trigger information in a non-trigger state. To be specific, the first trigger information sent by the coordinated network device of the terminal instructs the terminal not to send a first reference signal. For still another example, it is stipulated that first trigger information sent by a coordinated network device of the terminal is invalid, that is, in a case in which the first trigger information sent by the coordinated network device of the terminal triggers the terminal either to send the first reference signal or not to send the first reference signal, the terminal considers the first trigger information invalid, and then the terminal does not perform any processing based on the first trigger information.

It should be understood that, in this embodiment of this application, whether the plurality of pieces of DCI are specifically sent by the serving network device, or sent by the coordinated network device, or separately sent by the serving network device and the coordinated network device is not specifically limited.

Optionally, the DCI #1 to the DCI #N in this embodiment of this application may be all in DCI formats 0/4/1A. or may be all in DCI formats 2B/2C/2D. It should be understood that, the illustrated DCI formats are merely used as examples for description herein, and any DCI format in future 5G may also be applicable. DCI formats of the DCI #1 to the DCI #N in this application are not specifically limited.

S320. The terminal determines target first trigger information from the plurality of pieces of first trigger information.

Specifically, the terminal determines target trigger information from the first trigger information #1 to the first trigger information #N. The target trigger information may be understood as trigger information that is considered to be valid by the terminal. In the first trigger information #1 to the first trigger information #N, all first trigger information except the target trigger information is considered to be invalid by the terminal. There may be one or more pieces of target trigger information. To be specific, the target trigger information may be one or more pieces of first trigger information in the first trigger information #1 to the first trigger information #N. A quantity of pieces of the target trigger information is not specifically limited in this application.

Optionally, the terminal may determine the target first trigger information from the first trigger information #1 to the first trigger information #N in the following manners.

Manner 1

The terminal determines, as the target first trigger information, one piece of first trigger information that is in the first trigger information #1 to the first trigger information #N and that instructs the terminal to send a first reference signal. For ease of understanding and distinguishing, the unique piece of first trigger information that instructs the terminal to send a first reference signal is denoted as first trigger information #W herein.

Specifically, the first trigger information #W is included in the first trigger information #1 to the first trigger information #N. The first trigger information #W is used to instruct the terminal to send a first reference signal, and remaining first trigger information in the first trigger information #1 to the first trigger information #N except the first trigger information #W is all used to instruct the terminal not to send a first reference signal. In this case, the terminal determines the first trigger information #W as the target first trigger information.

It should be understood that, the first trigger information #W may only instruct the terminal to send a first reference signal, and may also indicate, to the terminal, at least one set of corresponding parameters or at least one group of resources to be used for sending the first reference signal. For example, the first reference signal is an SRS, and correspondingly, the first trigger information is SRS trigger information. It is assumed that DCI #W is in a DCI format 4. According to Table 1, when the first trigger information #W is '10', the terminal may be instructed to send an SRS based on the second set of SRS parameters. It is assumed that DCI #W is in DCI formats 0/1A/2B/2C/2D. Similarly, according to the foregoing description, the first trigger information #W may instruct the terminal to send an SRS based on a set of SRS parameters configured for the terminal by using RRC signaling.

Optionally, the first trigger information #W is sent by the serving network device of the terminal, or is sent by the coordinated network device of the terminal. DCI that carries the first trigger information #W is recorded as DCI #W herein.

For example, when the network device schedules the terminal to perform NCJT, each of the serving network device and the coordinated network device of the terminal sends one piece of DCI that is in the DCI #1 to the DCI #N, and network devices (including the serving network device and the coordinated network device of the terminal) may interact with each other through an X2 interface. It is stipulated that first trigger information included in DCI sent by the coordinated network device is in a disabled state, that is, does not trigger the terminal to send a first reference signal, and first trigger information included in DCI sent by the serving network device may trigger the terminal to send a first reference signal or may alternatively be in the disabled state. In this case, if the first trigger information #1 to the first trigger information #N that are received by the terminal are all in the disabled state, the terminal does not send a first reference signal. If the terminal receives the first trigger information #W that triggers the terminal to send a first reference signal, the terminal determines the first trigger information #W as the target first trigger information.

It should be understood that, in this embodiment of this application, an enabled state of first trigger information sent by the serving network device and the coordinated network device may also be stipulated by using a protocol (instead of using an X2 interface for interaction). For example, it may be stipulated that the coordinated network device can only send first trigger information in the disabled state, but the serving network device may send first trigger information in either status, which is not specifically limited in this embodiment of this application. For a person skilled in the art to understand the solution more clearly, the solution is described in more detail by using an example in which the first trigger information #1 to the first trigger information #N are an SRS #1 to an SRS #N, respectively, and the DCI #1 to the DCI #N are all in the DCI format 4.

When the network device schedules the terminal to perform NCJT, it may be stipulated that SRS trigger information of the coordinated network device can only be '00', and SRS trigger information of the serving network device can be any one of '00', '01', '10', and '11'. In this case, if the SRS #1 to the SRS #N received by the terminal are all '00', the terminal does not send an SRS. If the SRS #1 to the SRS #N received by the terminal includes SRS trigger information that triggers the terminal to send an SRS, the terminal sends the SRS. For example, when the terminal receives SRS trigger information that is '01', the terminal sends an SRS based on a first set of SRS parameters.

Manner 2

The terminal determines the first trigger information based on at least one of resource locations of the plurality of pieces of DCI, aggregation levels of the plurality of pieces of DCI, scrambling modes of the plurality of pieces of DCI, and first indication information included in the plurality of pieces of DCI.

Specifically, the terminal determines first trigger information included in target DCI as the target first trigger information, where the target DCI meets at least one of the following conditions:

(1) the target DCI is carried at a target resource location;
(2) an aggregation level of the target DCI is a target aggregation level;
(3) a scrambling mode of the target DCI is a target scrambling mode; and
(4) first indication information included in the target DCI is target first indication information.

For example, it may be stipulated in a protocol or system that the terminal considers only first trigger information that meets any condition or any combination of the foregoing conditions (1) to (4) as valid trigger information, and considers first trigger information that does not meet a corresponding condition as invalid trigger information.

Optionally, the network device may notify the terminal of at least one of the target resource location, the target aggregation level, the target scrambling mode, and the target first indication information by using higher layer signaling or DCI.

The foregoing described conditions are detailed below.

Condition (1)

Optionally, a target location may be any one of a target search space, a target candidate control channel set, a target carrier, and a target control resource set.

In an embodiment of this application, time-frequency resources carrying the DCI #1 to the DCI #N are located in at least one search space of the terminal. The terminal determines, as the target first trigger information, first trigger information included in DCI that is detected in a target search space in the at least one search space.

Optionally, the at least one search space is in a one-to-one correspondence with the DCI #1 to the DCI #N. In other words, each search space is used to carry one piece of DCI. For ease of understanding and description, the at least one search space of the terminal is denoted as a search space #1 to a search space #N, and the search space #1 to the search space #N are in a one-to-one correspondence with the DCI #1 to the DCI #N. The terminal uses, as the target first trigger information, the first trigger information included in the DCI that is detected in the target search space (for example, denoted as a search space #J, where 1≤J≤N) in the search space #1 to the search space #N. Optionally, the search space #1 to the search space #N may be predefined or preconfigured.

Further, the search space #J corresponds to the serving network device of the terminal. To be specific, the serving network device may use a time-frequency resource in the search space #J. The coordinated network device may use a time-frequency resource in another search space in the search space #1 to the search space #N. In this case, the terminal may detect, in the search space #J, the DCI sent by the serving network device, and detect, in the another search space, the DCI sent by the coordinated network device. In other words, the DCI detected by the terminal in the search space #J is sent by the serving network device, and the DCI detected by the terminal in the another search space is sent by the coordinated network device. The terminal determines, as the target first trigger information, first trigger information included in the DCI sent by the serving network device.

In another embodiment of this application, the DCI #1 to the DCI #N may be carried on at least one candidate control channel set in a same search space. The terminal determines, as the target first trigger information, first trigger information included in DCI that is detected by using a target candidate control channel set in the at least one candidate control channel set.

Optionally, the at least one candidate control channel set is in a one-to-one correspondence with the DCI #1 to the DCI #N. In other words, each candidate control channel set is used to carry one piece of DCI. For ease of understanding and description, the at least one candidate control channel set is denoted as a candidate control channel set #1 to a candidate control channel set #N, and the DCI #1 to the DCI #N are in a one-to-one correspondence with the candidate control channel set #1 to the candidate control channel set #N. The terminal uses, as the target first trigger information, the first trigger information included in the DCI that is detected on the target candidate control channel set (for example, denoted as a candidate control channel set #Q, where 1≤Q≤N) in the candidate control channel set #1 to the candidate control channel set #N. Optionally, the candidate control channel set #1 to the candidate control channel set #N may be predefined or preconfigured.

Further, the candidate control channel set #Q corresponds to the serving network device of the terminal. To be specific, the serving network device sends DCI on the candidate control channel set #Q. The coordinated network device sends DCI on another candidate control channel set in the candidate control channel set #1 to the candidate control channel set #N. Correspondingly, the terminal may detect the DCI sent by the serving network device on the candidate control channel set #Q. and detect the DCI sent by the coordinated network device on the another candidate control channel set. In other words, the DCI detected by the terminal on the candidate control channel set #Q is sent by the serving network device, and the DCI detected by the terminal on the another candidate control channel set is sent by the coordinated network device. The terminal determines, as the target first trigger information, first trigger information included in the DCI sent by the serving network device.

In still another embodiment of this application, the DCI #1 to the DCI #N may be carried on at least one carrier. The terminal determines, as the target first trigger information, first trigger information included in DCI that is detected on a target carrier in the at least one carrier.

Optionally, the at least one carrier is in a one-to-one correspondence with the DCI #1 to the DCI #N. In other words, each carrier is used to send one piece of DCI. For ease of understanding and description, the at least one carrier is denoted as a carrier #1 to a carrier #N, and the DCI #1 to the DCI #N are in a one-to-one correspondence with the carrier #1 to the carrier #N. The terminal uses, as the target first trigger information, the first trigger information included in the DCI that is detected on the target carrier (for example, denoted as a carrier #R, where 1≤R≤N) in the carrier #1 to the carrier #N. Optionally, the carrier #1 to the carrier #N may be predefined or preconfigured.

Further, the carrier #R corresponds to the serving network device of the terminal. To be specific, the serving network device sends DCI on the carrier #R. The coordinated network device sends DCI on another carrier in the carrier #1 to the carrier #N. Correspondingly, the terminal may detect the DCI sent by the serving network device on the carrier #R, and detect the DCI sent by the coordinated network device on the another carrier. In other words, the DCI detected by the terminal on the carrier #R is sent by the serving network device, and the DCI detected by the terminal on the another carrier is sent by the coordinated network device. The terminal determines, as the target first trigger information, first trigger information included in the DCI sent by the serving network device.

In yet another embodiment of this application, the DCI #1 to the DCI #N may be carried on at least one control resource set. The terminal determines, as the target first trigger information, first trigger information included in DCI that is detected on a target control resource set in the at least one control resource set.

Optionally, the at least one control resource set is in a one-to-one correspondence with the DCI #1 to the DCI #N. In other words, one piece of DCI is sent on a resource in each control resource set. For ease of understanding and description, the at least one control resource set is denoted as a control resource set #1 to a control resource set #N, and the DCI #1 to the DCI #N are in a one-to-one correspondence with the control resource set #1 to the control resource set #N. The terminal uses, as the target first trigger information, the first trigger information included in the DCI that is detected on the target control resource set (for example, denoted as a control resource set #V, where 1≤V≤N) in the control resource set #1 to the control resource set #N.

Optionally, the control resource set #1 to the control resource set #N may be predefined or preconfigured.

Further, the control resource set #V corresponds to the serving network device of the terminal. To be specific, the serving network device sends DCI on a resource in the control resource set #V The coordinated network device sends DCI on a resource in another control resource set in the control resource set #1 to the control resource set #N. Correspondingly, the terminal may detect the DCI sent by the serving network device on the resource in the control resource set #V, and detect the DCI sent by the coordinated network device on the resource in the another control resource set. In other words, the DCI detected by the terminal on the resource in the control resource set #V is sent by the serving network device, and the DCI detected by the terminal on the resource in the another control resource set is sent by the coordinated network device. The terminal determines, as the target first trigger information, first trigger information included in the DCI sent by the serving network device.

It should be understood that the search space, candidate control channel set, control resource set, and carrier are merely examples for describing a manner in which the terminal determines the target first trigger information based on a location of detected DCI. This should not be construed as any limitation on this application. In this application, a location of DCI may also be defined or identified in another manner, for example, may be specifically defined or identified at a time-frequency resource location, in a subcarrier spacing, or the like. This is not limited in this embodiment of this application.

Condition (2)

Specifically, the DCI #1 to the DCI #N received by the terminal is generated by using at least one aggregation level. The terminal determines, as the target first trigger information, first trigger information included in DCI that is generated by using a target aggregation level in the at least one aggregation level.

Optionally, the at least one aggregation level is in a one-to-one correspondence with the DCI #1 to the DCI #N. In other words, different DCI is generated by using different aggregation levels. In the following, for ease of understanding and description, the at least one aggregation level is denoted as an aggregation level #1 to an aggregation level #N, and the aggregation level #1 to the aggregation level #N are in a one-to-one correspondence with the DCI #1 to the DCI #N. The terminal may use, as the target first trigger information, first trigger information included in DCI whose aggregation level is a target aggregation level (for example, denoted as an aggregation level #S, where 1≤S≤N). Optionally, the aggregation level #1 to the aggregation level #N may be predefined or preconfigured.

Further, the aggregation level #S corresponds to the serving network device of the terminal. To be specific, the serving network device generates DCI #S based on the aggregation level #S, and sends the DCI #S to the terminal. In this case, the terminal determines, as the target first trigger information, first trigger information included in the DCI #S sent by the serving network device.

Condition (3)

Specifically, the DCI #1 to the DCI #N may be scrambled by using at least one scrambling mode. The terminal determines, as the target first trigger information, first trigger information included in DCI that uses a target scrambling mode in the at least one scrambling mode.

Optionally, the at least one aggregation level is in a one-to-one correspondence with the DCI #1 to the DCI #N.

In other words, different DCI is generated by using different scrambling modes. In the following, for ease of understanding and description, the at least one scrambling mode is denoted as a scrambling mode #1 to a scrambling mode #N, and the scrambling mode #1 to the scrambling mode #N are in a one-to-one correspondence with the DCI #1 to the DCI #N. After receiving the DCI #1 to the DCI #N, the terminal respectively descrambles DCI corresponding to the scrambling mode #1 to the scrambling mode #N by using the scrambling mode #1 to the scrambling mode #N. If a specific piece of DCI may be descrambled by using a target descrambling mode (for example, denoted as a descrambling mode #T, where the descrambling mode #T corresponds to a scrambling mode #T, where $1 \leq T \leq N$), first trigger information included in the piece of DCI is determined as the first target trigger information. Optionally, the scrambling mode #1 to the scrambling mode #N may be predefined or preconfigured.

Further, when scrambling is performed on DCI, cyclic redundancy check (cyclic redundancy check. CRC) scrambling may be performed by using a terminal identity (UE identity, UE ID) and a cell identity (cell ID). The UE ID may be, for example, a cell radio network temporary identifier (cell radio network temporary identifier, C-RNTI), and the cell ID may be, for example, a physical layer cell ID (physical layer cell identity, PCI).

Optionally, the scrambling mode #T corresponds to the serving network device of the terminal. To be specific, the serving network device generates DCI #T by using the scrambling mode #T, and sends the DCI #T to the terminal. In this case, the terminal may descramble the DCI #T by using the descrambling mode #T, and determine first trigger information included in the DCI #T (to be specific, the DCI sent by the serving network device) as the target first trigger information.

It should be understood that specific scrambling modes of the scrambling mode #1 to the scrambling mode #N are not specifically limited in this embodiment of this application, provided that the scrambling mode #T corresponds to the serving network device. It should be further understood that the UE ID and the cell identity are not specifically limited in this embodiment of this application, either. The enumerated UE ID and cell identity are merely examples for description.

Condition (4)

Specifically, each piece of DCI in the DCI #1 to the DCI #N may include first indication information. For example, the first indication information may be 1 bit (1 bit) in the DCI, and the bit may be '1' or '0'. In this embodiment of this application, it may be stipulated or preconfigured that the terminal uses first indication information as the target first indication information. For example, the terminal uses first trigger information included in DCI whose first indication information is '1' as the target first trigger information.

Optionally, the first indication information may be part of the first trigger information.

Optionally, the first indication information may be used to indicate whether corresponding DCI is sent by the serving network device or sent by the coordinated network device. For example, when the bit is '0', it indicates that the corresponding DCI is sent by the coordinated network device; or when the bit is '1', it indicates that the corresponding DCI is sent by the serving network device. Therefore, the terminal uses the first trigger information included in the DCI that includes the first indication information '1' as the target first trigger information. In other words, the terminal determines first trigger information included in the DCI sent by the serving network device as the target first trigger information.

It should be understood that the conditions (1) to (4) may be used in combination. In this case, the terminal determines first trigger information in DCI that satisfies any combination of the conditions (1) to (4) as the target first trigger information. For brevity, a case in which the conditions (1) to (4) are used in combination are not described in detail herein. For details, refer to the foregoing descriptions of the conditions (1) to (4).

Manner 3

The terminal first determines target DCI (for example, denoted as DCI #D, where $1 \leq D \leq N$) in the DCI #1 to the DCI #N. Then, first trigger information in the DCI #D is determined as the target first trigger information.

Specifically, the target DCI is determined in a predefined manner or determined through interaction between network devices. For example, it is specified, in a predefined manner or through interaction between network devices, that the target DCI is DCI sent by the serving network device. The terminal uses only first trigger information in the DCI sent by the serving network device as valid trigger information, and ignores first trigger information sent by the coordinated network device. In this case, the terminal needs to identify a specific piece of DCI that is sent by the serving network device, and a specific piece of DCI that is sent by the coordinated network device. The following describes in detail how the terminal determines the DCI #D in two cases.

Case 1

The first trigger information sent by the coordinated network device can only trigger a disabled state, and the first trigger information sent by the serving network device may trigger either status.

Specifically, it may be stipulated in a protocol or may be determined through negotiation between network devices that the first trigger information sent by the coordinated network device can only trigger the disabled state. For example, the first trigger information sent by the coordinated network device can only be '00', and the first trigger information sent by the serving network device may trigger either status. For example, the first trigger information sent by the serving network device may be any one of '01', '10', '1', or '00'. In this ways, the terminal may determine, based on whether first trigger information triggers sending of a first reference signal, the DCI sent by the serving network device, so as to determine the target first trigger information. It should be noted that, if the first trigger information sent by the serving network device is in the disabled state, the terminal does not send a first reference signal, and thus it is unnecessary to determine a specific piece of DCI sent by the serving network device.

Case 2

The first trigger information sent by the coordinated network device may trigger either status.

In this case, in a possible implementation, the terminal may determine the DCI #D based on any one of a location of detected DCI, an aggregation level of detected DCI, a scrambling mode of detected DCI, or second indication information included in detected DCI, so as to determine the target first trigger information.

Specifically, the serving network device and the coordinated network device may send DCI based on at least one of the following: different resource locations, different aggregation levels, different scrambling modes, and different second indication information. DCI information may be stipulated or configured in advance in a protocol or a system.

The DCI information may be defined as at least one of a location of the DCI sent by the serving network device, an aggregation level of the DCI sent by the serving network device, a scrambling mode of the DCI sent by the serving network device, and second indication information included in the DCI sent by the serving network device. Because the DCI information is stored by both the network device and a terminal, the terminal may determine, based on at least one of corresponding locations of detected DCI in the DCI #1 to the DCI #N, corresponding aggregation levels of detected DCI in the DCI #1 to the DCI #N, corresponding scrambling modes of detected DCI in the DCI #1 to the DCI #N, and second indication information included in detected DCI in the DCI #1 to the DCI #N, the DCI sent by the serving network device, namely, the DCI #D.

It should be understood that the second indication information may be used to indicate whether corresponding DCI is sent by the serving network device or sent by the coordinated network device. For example, the second indication information may be the same as the first indication information. For details about the second indication information, refer to the foregoing descriptions of the first indication information. For brevity, details are not described herein.

Optionally, when determining the DCI #D based on the location of the detected DCI, the terminal may specifically determine the DCI #D based on a search space in which the DCI is located, a candidate control channel set on which the DCI is carried, or a carrier on which the DCI is carried.

It should be understood that, for a specific implementation process in which the terminal determines the DCI #D based on any one of the location of the detected DCI, the aggregation level of the detected DCI, the scrambling mode of the detected DCI, or the second indication information included in the detected DCI, refer to the corresponding descriptions in Manner 2. For brevity, details are not described herein.

It should be further understood that the target DCI may alternatively be DCI sent by the coordinated network device. This is not limited in this embodiment of this application.

Manner 4

The terminal determines the target first trigger information based on priorities of the first trigger information #1 to the first trigger information #N.

Specifically, the DCI #1 to the DCI #N may include third indication information, and the third indication information is used to indicate a priority of first trigger information in corresponding DCI. For example, the third indication information may be 1 bit (1 bit) in the DCI, and the bit may be '1' or '0'. '1' indicates a high priority, and '0' indicates a low priority. The terminal uses first trigger information having the high priority as the target first trigger information based on the third indication information.

Optionally, the first trigger information having the high priority, namely, the target first trigger information, may be sent by the serving network device. In other words, a priority of first trigger information sent by the serving network device is higher than a priority of first trigger information sent by the coordinated network device.

Manner 5

The terminal determines the first trigger information #1 to the first trigger information #N all as the target first trigger information. In other words, all the first trigger information is valid.

In this case, the first trigger information #1 to the first trigger information #N may be the same, or may be different. This is not limited in this embodiment of this application.

Further, resources corresponding to the plurality of pieces of first trigger information may be the same or may be different. This is not limited in this embodiment of this application. Still further, precoding matrices of a plurality of groups of resources corresponding to the plurality of pieces of first trigger information may be the same or may be different.

S330. The terminal performs, based on the target first trigger information, sending processing on the first reference signal.

Specifically, after determining the target first trigger information, the terminal does not send the first reference signal based on the target first trigger information, or send the first reference signal based on a resource indicated by the target first trigger information or configured by using higher layer RRC signaling.

According to the transmission method in this embodiment of this application, in a case in which the plurality of pieces of first trigger information are received, the terminal can determine the target first trigger information from the plurality of pieces of first trigger information, and further perform sending processing on the first reference signal based on the target first trigger information. Therefore, a prior-art problem that after receiving a plurality of pieces of first trigger information, a terminal has a different understanding of the first trigger information, and does not know how to process a first reference signal can be resolved, and system performance can be improved.

Optionally, information that needs to be preconfigured in this application, for example, the search space and aggregation level described above may be configured by using higher layer signaling such as radio resource control (radio resource control, RRC) signaling or media access control control element (media access control control element, MAC CE) signaling.

Figure 2:
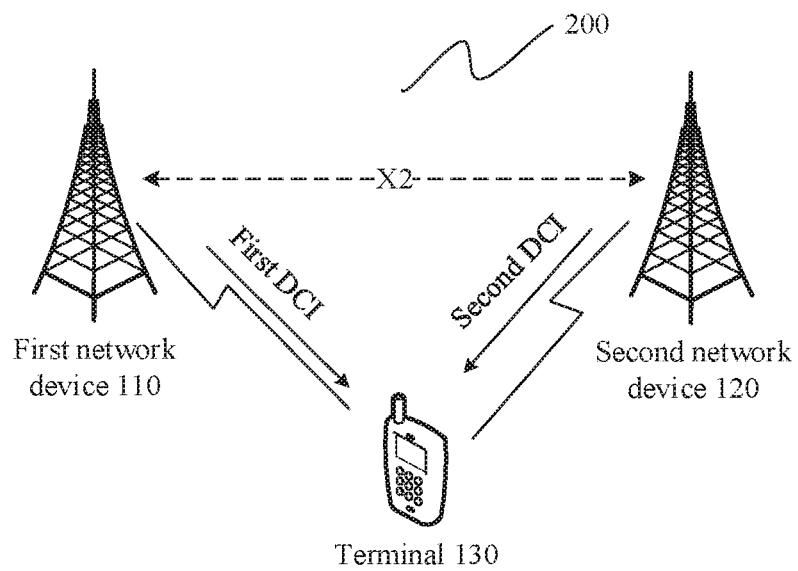
FIG. 2 is a schematic diagram of another communications system according to an embodiment of this application.
Figure 4:
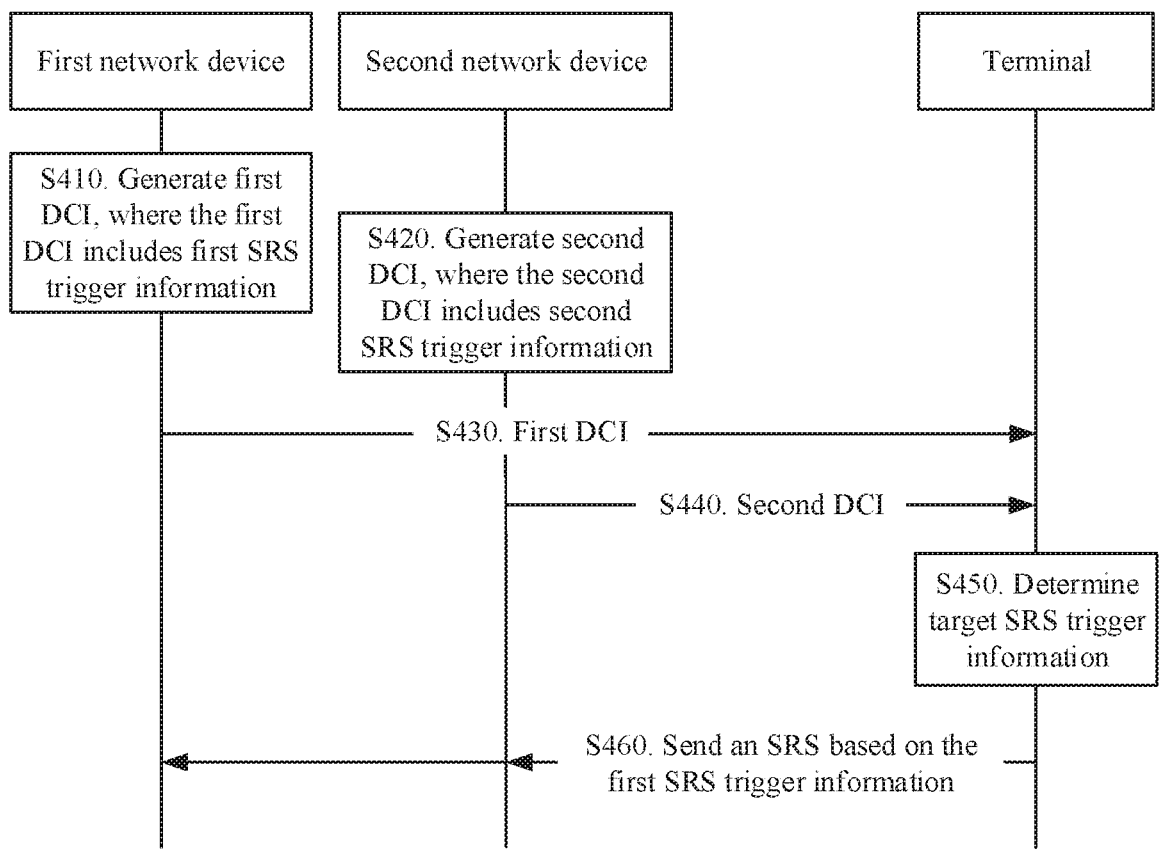
FIG. 4 is a schematic flowchart of a transmission method according to another embodiment of this application.

For a person skilled in the art to better understand this application, the following describes a transmission method according to a specific embodiment of this application by using an example in which the first trigger information is SRS trigger information with reference to FIG. 2 and FIG. 4. FIG. 4 is a schematic flowchart of a transmission method according to a specific embodiment of this application. A first network device and a second network device in FIG. 4 may be respectively corresponding to the first network device 110 and the second network device 120 shown in FIG. 2. The first network device is a serving network device of a terminal, and the second network device is a coordinated network device of the terminal.

S410. The first network device generates first DCI.

Specifically, the first DCI includes first SRS trigger information, and the first SRS trigger information is used to trigger the terminal to send an SRS based on a first set of SRS parameters.

S420. The second network device generates second DCI.

Specifically, the second DCI includes second SRS trigger information, and the second SRS trigger information is used to trigger the terminal to send an SRS based on a second set of SRS parameters, or the second SRS trigger information is used to instruct the terminal not to send an SRS.

S430. The first network device sends the first DCI.

S440. The second network device sends the second DCI.

It should be understood that S410 and S420 may be performed simultaneously or non-simultaneously. A sequence of S410 and S420 is not limited in this application. Correspondingly, S430 and S440 may be performed simultaneously or non-simultaneously. A sequence of S430 and S440 is not limited in this application. In addition, a sequence of performing S420 and S430 is not limited, either.

S450. The terminal determines target SRS trigger information based on the first DCI and the second DCI.

In an embodiment of this application, the terminal may determine, based on locations, aggregation levels, scrambling modes, or the like of detected first DCI and detected second DCI, that the first DCI is DCI sent by the first network device, namely, a serving network device of the terminal, and the second DCI is DCI sent by the second network device, namely, a coordinated network device of the terminal. Further, the terminal determines the first DCI as a target DCI, and determines first SRS trigger information included in the target DCI as the target SRS trigger information.

In another embodiment of this application, the first DCI includes first indication information #1, and the first indication information #1 is used to indicate that the first DCI is sent by the first network device, that is, sent by the serving network device of the terminal. The second DCI includes first indication information #2, where the first indication information #2 is used to indicate that the second DCI is sent by the second network device, that is, the second DCI is sent by the coordinated network device of the terminal. Therefore, the terminal determines, based on the first indication information #1 and the first indication information #2, the first SRS trigger information as the target SRS trigger information.

S460. The terminal sends an SRS based on the target SRS trigger information.

Specifically, the terminal sends the SRS based on the first set of SRS parameters. For example, the terminal may determine, based on the first set of SRS parameters, an SRS sequence, a time domain resource and a frequency domain resource that are used for sending the SRS, an antenna port resource, a precoding matrix used by the SRS sequence, a comb structure used by the SRS sequence, or the like, and then send the SRS based on the determined parameters.

Therefore, according to the transmission method in this embodiment of this application, in a case in which the terminal receives a plurality of pieces of SRS trigger information (for example, the first SRS trigger information and the second SRS trigger information), the terminal can perform sending processing on the SRS trigger information. Therefore, a prior-art problem that after receiving a plurality of pieces of SRS trigger information, the terminal has a different understanding of sending processing of an SRS is resolved, and system performance can be improved.

The foregoing describes, in detail with reference to FIG. 3 and FIG. 4, the transmission methods according to the embodiments of this application. The following describes, in detail with reference to FIG. 5 to FIG. 8, terminals and network devices in the embodiments of this application.

Figure 5:
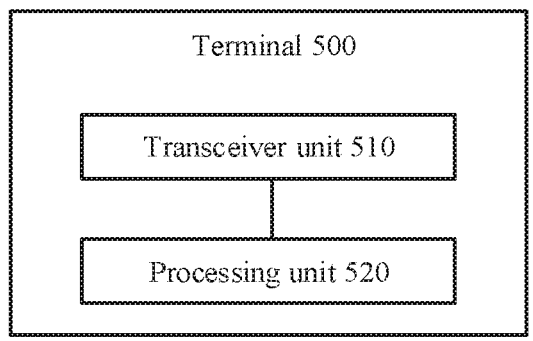
FIG. 5 is a schematic block diagram of a terminal according to an embodiment of this application.

FIG. 5 is a schematic block diagram of a terminal 500 according to an embodiment of this application. As shown in FIG. 5, the terminal 500 includes: a transceiver unit 510 and a processing unit 520.

The transceiver unit 510 is configured to receive a plurality of pieces of downlink control information DCI, the DCI includes at least first trigger information that is in a one-to-one correspondence with the DCI, and the first trigger information is used to indicate, to the terminal, a resource used by a first reference signal and/or sending processing of the first reference signal. The processing unit 520 is configured to determine target first trigger information from a plurality of pieces of first trigger information. The transceiver unit 510 is further configured to perform, based on the target first trigger information, sending processing on the first reference signal.

Optionally, the processing unit 520 is specifically configured to:

determine, as the target first trigger information, one of the plurality of pieces of first trigger information that instructs the terminal to send the first reference signal.

Optionally, the processing unit 520 is specifically configured to:

determine the first trigger information based on at least one of resource locations of the plurality of pieces of DCI, aggregation levels of the plurality of pieces of DCI, scrambling modes of the plurality of pieces of DCI, and first indication information included in the plurality of pieces of DCI.

Optionally, the processing unit 520 is specifically configured to:

determine target DCI from the plurality of pieces of DCI, and the target DCI is determined in a predefined manner or determined through interaction between network devices; and determine, as the target first trigger information, first trigger information included in the target DCI.

Optionally, the processing unit 520 is specifically configured to:

determine the target DCI based on at least one of resource locations of the plurality of pieces of DCI, aggregation levels of the plurality of pieces of DCI, scrambling modes of the plurality of pieces of DCI, and first indication information included in the plurality of pieces of DCI.

Optionally, target resource location is any one of the following:

a target search space, a target candidate control channel set, and a target control resource set.

Optionally, the resource used by the first reference signal includes at least one of a first reference signal sequence, a time domain resource, a frequency domain resource, a numerology, a precoding matrix used by the first reference signal sequence, and a comb structure used by the first reference signal sequence.

It should be understood that the terminal 500 may be corresponding to the terminals in the transmission methods according to the embodiments of this application, and the terminal 500 may include units configured to perform the methods performed by the terminals in the methods shown in FIG. 3 and FIG. 4. In addition, the units in the terminal 500 and the foregoing other operations and/or functions are respectively used to implement corresponding procedures of the methods shown in FIG. 3 and FIG. 4. Specifically, the transceiver unit 510 is configured to perform S310 and S330 in the method shown in FIG. 3, and the processing unit 520 is configured to perform S320 in the method shown in FIG. 3. The transceiver unit 510 is further configured to perform S430, S440, and S460 in the method shown in FIG. 4, and the processing unit 520 is configured to perform S450 in the method shown in FIG. 4. A specific process in which each unit performs the foregoing corresponding steps is described above in detail, and for brevity, details are not described herein.

Figure 6:
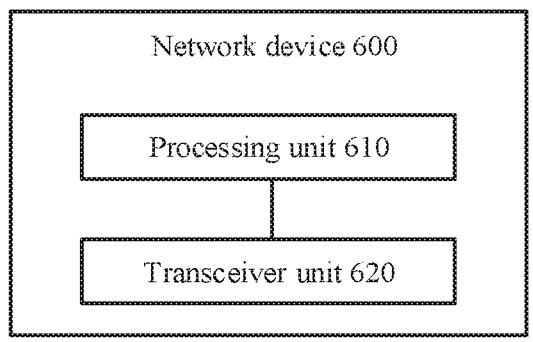
FIG. 6 is a schematic block diagram of a network device according to an embodiment of this application.

FIG. 6 is a schematic block diagram of a network device 600 according to an embodiment of this application. As shown in FIG. 6, the terminal 600 includes: a processing unit 610 and a transceiver unit 620.

The processing unit 610 is configured to determine at least one piece of downlink control information DCI in a plurality of pieces of DCI. The DCI includes at least first trigger information; the first trigger information is used to indicate, to a terminal, a resource used by a first reference signal and/or sending processing of the first reference signal; the plurality of pieces of DCI are used by the terminal to determine target first trigger information from a plurality of pieces of first trigger information; the target first trigger information is used by the terminal to determine sending processing of the first reference signal; and the plurality of pieces of DCI are in a one-to-one correspondence with the plurality of pieces of first trigger information. The transceiver unit 620 is configured to send the at least one piece of DCI to the terminal.

Optionally, the at least one piece of DCI is determined in a predefined manner or in a manner of interaction with another network device serving the terminal.

Optionally, the DCI further includes first indication information, and the first indication information is used to indicate that the network device is a serving network device or a coordinated network device of the terminal.

Optionally, the network device is the coordinated network device of the terminal, and at least one piece of first trigger information included in the at least one piece of DCI is used to instruct the terminal not to send the first reference signal.

Optionally, the plurality of pieces of first trigger information are the same.

It should be understood that the network device 600 may be corresponding to the network devices in the transmission methods according to the embodiments of the present invention, and the network device 600 may include units configured to perform the method performed by the network device in the method shown in FIG. 3, or units configured to perform the method performed by the first network device and/or the second network device in the method shown in FIG. 4. In addition, the units in the network device 600 and the foregoing other operations and/or functions are respectively used to implement corresponding procedures of the methods shown in FIG. 3 and FIG. 4. Specifically, the transceiver unit 620 is configured to perform S310 in the method shown in FIG. 3, and the transceiver unit 620 is further configured to perform S430, S440, and S460 in the method shown in FIG. 4. The processing unit 610 is configured to perform S410 and S420 in the method shown in FIG. 4. A specific process in which each unit performs the foregoing corresponding steps is described above in detail, and for brevity, details are not described herein.

Figure 7:
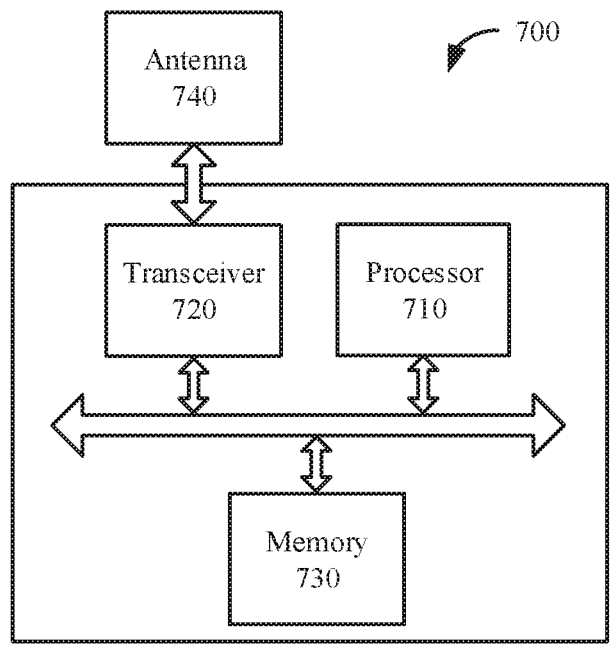
FIG. 7 is another schematic block diagram of a terminal according to an embodiment of this application.

FIG. 7 is another schematic block diagram of a terminal 700 according to an embodiment of this application. As shown in FIG. 7, the terminal 700 includes a processor 710 and a transceiver 720. Optionally, the terminal 700 further includes a memory 730. The processor 710, the transceiver 720, and the memory 730 communicate with each other by using an internal connection path, to transfer a control signal and/or a data signal. The memory 730 is configured to store a computer program. The processor 710 is configured to invoke the computer program from the memory 730 and run the computer program, so as to control the transceiver 720 to receive and send a signal. When a program instruction stored in the memory 730 is executed by the processor 710, the transceiver 720 is configured to receive a plurality of pieces of downlink control information DCI, the DCI includes at least first trigger information that is in a one-to-one correspondence with the DCI, and the first trigger information is used to indicate, to the terminal, a resource used by a first reference signal and/or sending processing of the first reference signal. The processor 710 is configured to determine target first trigger information from a plurality of pieces of first trigger information. In addition, the transceiver 720 is further configured to perform, based on the target first trigger information, sending processing on the first reference signal.

The processor 710 and the memory 730 may be integrated into a processing apparatus. The processor 710 is configured to execute program code stored in the memory 730 to implement the foregoing functions. In specific implementation, the memory 730 may alternatively be integrated into the processor 710, or may be independent of the processor 710.

The terminal may further include an antenna 740, and the antenna 740 is configured to send, by using a radio signal, downlink data or downlink control signaling output by the transceiver 720. Specially, the terminal 700 may be corresponding to the terminals in the transmission methods according to the embodiments of this application, and the terminal 700 may include units configured to perform the methods performed by the terminals in the methods shown in FIG. 3 and FIG. 4. In addition, the units in the terminal 700 and the foregoing other operations and/or functions are respectively used to implement corresponding procedures of the methods shown in FIG. 3 and FIG. 4. Specifically, the memory 730 is configured to store program code, so that when executing the program code, the processor 710 is enabled to perform S320 in the method shown in FIG. 3, perform S450 in the method shown in FIG. 4, and control the transceiver 720 to perform, by using the antenna 740, S310 and S330 in the method shown in FIG. 3 and S430, S440, and S460 in the method shown in FIG. 4. A specific process in which each unit performs the foregoing corresponding steps is described in detail in the foregoing methods, and for brevity, details are not described herein.

Figure 8:
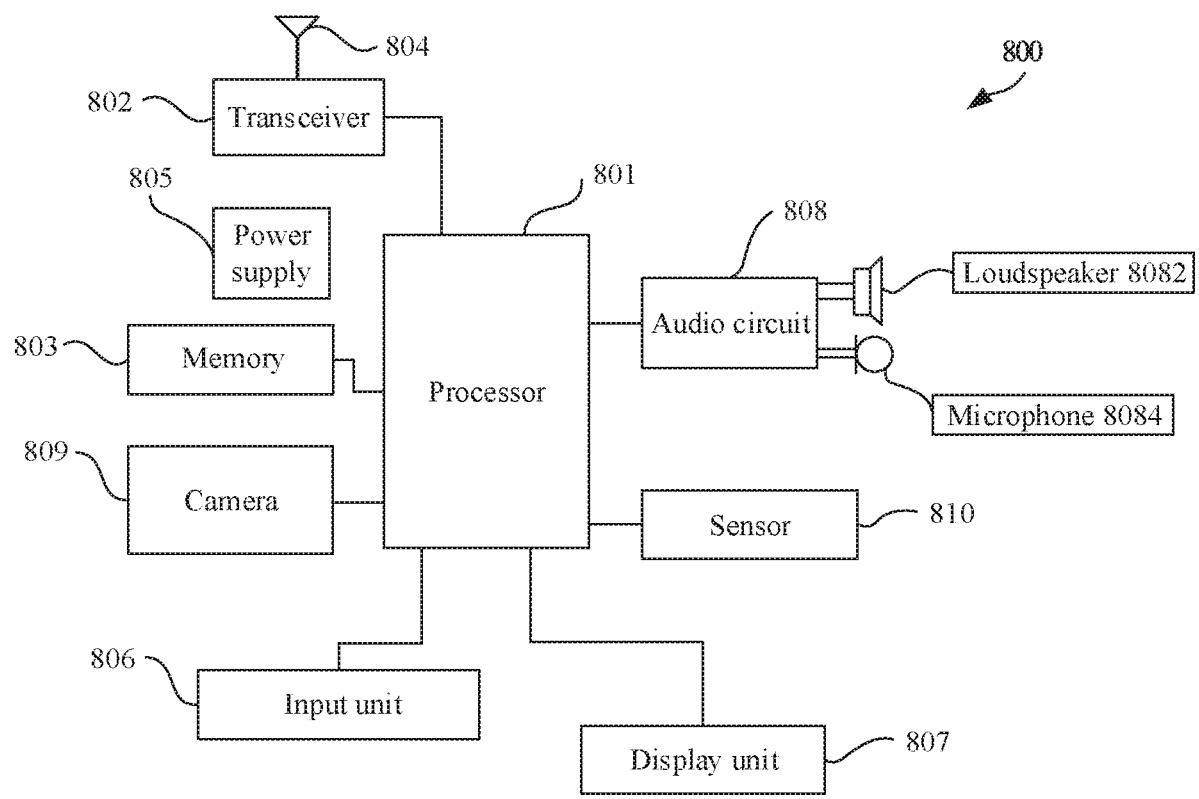
FIG. 8 is another schematic block diagram of a network device according to an embodiment of this application.

FIG. 8 is another schematic block diagram of a network device 800 according to an embodiment of this application. As shown in FIG. 8, the network device 800 includes a processor 801 and a transceiver 802. Optionally, the network device 800 further includes a memory 803. The processor 801, the transceiver 802, and the memory 803 communicate with each other by using an internal connection path, to transfer a control signal and/or a data signal. The memory 803 is configured to store a computer program. The processor 801 is configured to invoke the computer program from the memory 803 and run the computer program, so as to control the transceiver 802 to receive and send a signal.

When a program instruction stored in the memory 803 is executed by the processor 801, the processor 801 is configured to determine at least one piece of downlink control information DCI in a plurality of pieces of DCI. The DCI includes at least first trigger information; the first trigger information is used to indicate, to a terminal, a resource used by a first reference signal and/or sending processing of the first reference signal; the plurality of pieces of DCI are used by the terminal to determine target first trigger information from a plurality of pieces of first trigger information; the target first trigger information is used by the terminal to determine sending processing of the first reference signal; and the plurality of pieces of DCI are in a one-to-one correspondence with the plurality of pieces of first trigger information. The transceiver 802 is configured to send the at least one piece of DCI to the terminal.

The processor 801 and the memory 803 may be integrated into one processing apparatus. The processor 801 is configured to execute program code stored in the memory 803 to implement the foregoing functions. In specific implementation, the memory 803 may alternatively be integrated into the processor 801, or may be independent of the processor 801. The network device 800 may further include an antenna 804, and the antenna 804 is configured to send, by using a radio signal, uplink data or uplink control signaling output by the transceiver 802.

Specifically, the network device 800 may be corresponding to the network devices in the transmission methods according to the embodiments of the present invention, and the network device 800 may include units configured to perform the method performed by the network device in the method shown in FIG. 3, or units configured to perform the method performed by the first network device and/or the second network device in the method shown in FIG. 4. In addition, the units in the network device 800 and the foregoing other operations and/or functions are respectively used to implement corresponding procedures of the methods shown in FIG. 3 and FIG. 4. Specifically, the memory 803 is configured to store program code, so that when executing the program code, the processor 801 is enabled to perform S410 and S420 in the method shown in FIG. 4 and control the transceiver 802 to perform, by using the antenna 804, S430, S440 and S460 in the method shown in FIG. 4 or S310 in the method shown in FIG. 3. A specific process in which each unit performs the foregoing corresponding steps is described above in detail, and for brevity, details are not described herein.

The processor 801 may be configured to perform an action that is implemented inside the network device and that is described in the foregoing method embodiments, and the transceiver 802 may be configured to perform a transmission or sending action from the network device to the terminal described in the foregoing method embodiments. For details, refer to the descriptions in the foregoing method embodiments. Details are not described herein.

The processor 801 and the memory 803 may be integrated into one processing apparatus. The processor 801 is configured to execute program code stored in the memory 803 to implement the foregoing functions. In specific implementation, the memory 803 may alternatively be integrated into the processor 801.

The network device 800 may further include a power supply 805, configured to supply power to various devices or circuits in the network device.

In addition, to improve functions of the network device, the network device 800 may further include one or more of an input unit 806, a display unit 807, an audio circuit 808, a camera 809, a sensor 810, and the like. The audio circuit may further include a loudspeaker 8082, a microphone 8084, and the like.

It should be understood that, the processor in the embodiments of this application may be a central processing unit (central processing unit, CPU), or may further be another general purpose processor, a digital signal processor (digital signal processor, DSP), an application-specific integrated circuit (application-specific integrated circuit, ASIC), a field programmable gate array (field programmable gate array, FPGA), or another programmable logical device, discrete gate or transistor logical device, discrete hardware component, or the like.

It should be further understood that the memory in the embodiments of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of random access memories (random access memory, RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM).

All or some of the foregoing embodiments may be implemented by means of software, hardware, firmware, or any combination thereof. When software is used to implement the embodiments, the foregoing embodiments may be implemented completely or partially in a form of a computer program product. The computer program product includes one or more computer instructions. When the computer program instructions are loaded and executed on the computer, the procedures or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application.

The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc. The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A transmission method, comprising:
   receiving, by a terminal, a plurality of downlink control information (DCI), wherein each DCI of the plurality of DCI comprises at least first trigger information that is in a one-to-one correspondence with the DCI, and wherein the first trigger information is used to indicate, to the terminal, at least one of a resource used by a first reference signal or sending processing of the first reference signal;
   determining, by the terminal, target first trigger information from a plurality of first trigger information corresponding to the plurality of DCI, wherein the target first trigger information is one of the plurality of first trigger information and is considered to be valid trigger information by the terminal, and wherein all other first trigger information of the plurality of first trigger information is considered to be invalid trigger information by the terminal; and
   in response to determining the target first trigger information from the plurality of first trigger information corresponding to the plurality of DCI, performing, by the terminal and based on the target first trigger information, sending processing on the first reference signal.

2. The method according to claim 1, wherein the determining, by the terminal, target first trigger information from a plurality of first trigger information comprises:
   determining, by the terminal as the target first trigger information, one of the plurality of first trigger information that instructs the terminal to send the first reference signal.

3. The method according to claim 1, wherein the determining, by the terminal, target first trigger information from a plurality of first trigger information comprises:
   determining, by the terminal, the target first trigger information based on at least one of resource locations of the plurality of DCI, aggregation levels of the plurality of DCI, scrambling modes of the plurality of DCI, or first indication information comprised in the plurality of DCI.

4. The method according to claim 1, wherein the determining, by the terminal, target first trigger information from a plurality of first trigger information comprises:
   determining, by the terminal, target DCI from the plurality of DCI, wherein the target DCI is determined in a predefined manner or determined through interaction between network devices; and
   determining, by the terminal, first trigger information comprised in the target DCI as the target first trigger information.

5. The method according to claim 4, wherein the determining, by the terminal, target DCI from the plurality of DCI comprises:
   determining, by the terminal, the target DCI based on at least one of resource locations of the plurality of DCI, aggregation levels of the plurality of DCI, scrambling modes of the plurality of DCI, or first indication information comprised in the plurality of DCI.

6. The method according to claim 5, wherein a resource location is one of a search space, a candidate control channel set, and a control resource set.

7. The method according to claim 1, wherein the resource used by the first reference signal comprises at least one of a first reference signal sequence, a time domain resource, a frequency domain resource, a numerology, an antenna port resource, a precoding matrix used by the first reference signal sequence, or a comb structure used by the first reference signal sequence.

8. The method according to claim 1, wherein the first reference signal includes a demodulation reference signal (DMRS) or a channel state information reference signal (CSI-RS).

9. The method according to claim 1, wherein performing the sending processing on the first reference signal includes not sending the first reference signal.

10. The method according to claim 1, wherein each DCI of the plurality of DCI further comprises second trigger information, and wherein the second trigger information is used to indicate, to the terminal, at least one of a resource used by a second reference signal or sending processing of the second reference signal.

11. A terminal, comprising:
   a transceiver, the transceiver configured to receive a plurality of downlink control information (DCI), wherein each DCI of the plurality of DCI comprises at least first trigger information that is in a one-to-one correspondence with the DCI, and wherein the first trigger information is used to indicate, to the terminal, at least one of a resource used by a first reference signal or sending processing of the first reference signal;

at least one processor; and one or more memories coupled to the at least one processor and storing programming instructions for execution by the at least one processor to determine target first trigger information from a plurality of first trigger information corresponding to the plurality of DCI, wherein the target first trigger information is one of the plurality of first trigger information and is considered to be valid trigger information by the terminal, wherein all other first trigger information of the plurality of first trigger information is considered to be invalid trigger information by the terminal, and wherein:

the transceiver is further configured to perform, based on the target first trigger information, sending processing on the first reference signal in response to determining the target first trigger information from the plurality of first trigger information corresponding to the plurality of DCI.

12. The terminal according to claim 11, wherein the programming instructions are for execution by the at least one processor to:

determine, as the target first trigger information, one of the plurality of first trigger information that instructs the terminal to send the first reference signal.

13. The terminal according to claim 11, wherein the programming instructions are for execution by the at least one processor to:

determine the target first trigger information based on at least one of resource locations of the plurality of DCI, aggregation levels of the plurality of DCI, scrambling modes of the plurality of DCI, or first indication information comprised in the plurality of DCI.

14. The terminal according to claim 11, wherein the programming instructions are for execution by the at least one processor to:

determine target DCI from the plurality of DCI, and the target DCI is determined in a predefined manner or determined through interaction between network devices; and determine, as the target first trigger information, first trigger information comprised in the target DCI.

15. The terminal according to claim 14, wherein the programming instructions are for execution by the at least one processor to:

determine the target DCI based on at least one of resource locations of the plurality of DCI, aggregation levels of the plurality of DCI, scrambling modes of the plurality of DCI, or first indication information comprised in the plurality of DCI.

16. The terminal according to claim 15, wherein a resource location is one of a search space, a candidate control channel set, and a control resource set.

17. The terminal according to claim 11, wherein the resource used by the first reference signal comprises at least one of a first reference signal sequence, a time domain resource, a frequency domain resource, a numerology, an antenna port resource, a precoding matrix used by the first reference signal sequence, or a comb structure used by the first reference signal sequence.

18. A network device, comprising:

at least one processor;

one or more memories coupled to the at least one processor and storing programming instructions for execution by the at least one processor to determine at least one downlink control information (DCI) in a plurality of DCI, wherein each DCI of the plurality of DCI comprises at least first trigger information, wherein the first trigger information is used to indicate, to a terminal, a resource used by a first reference signal or sending processing of the first reference signal, wherein the plurality of DCI are used by the terminal to determine target first trigger information from a plurality of first trigger information corresponding to the plurality of DCI, wherein the target first trigger information is one of the plurality of first trigger information and is considered to be valid trigger information by the terminal, wherein all other first trigger information of the plurality of first trigger information is considered to be invalid trigger information by the terminal, wherein the target first trigger information is used by the terminal to determine sending processing of the first reference signal, and wherein the plurality of DCI are in a one-to-one correspondence with the plurality of first trigger information; and a transmitter, the transmitter configured to send the at least one DCI to the terminal in response to determining the at least one DCI in the plurality of DCI.

19. The network device according to claim 18, wherein the at least one DCI is determined in a predefined manner or in a manner of interaction with another network device serving the terminal.

20. A transmission method, comprising:

determining at least one downlink control information (DCI) in a plurality of DCI, wherein each DCI of the plurality of DCI comprises at least first trigger information, wherein the first trigger information is used to indicate, to a terminal, a resource used by a first reference signal or sending processing of the first reference signal, wherein the plurality of DCI are used by the terminal to determine target first trigger information from a plurality of first trigger information corresponding to the plurality of DCI, wherein the target first trigger information is one of the plurality of first trigger information and is considered to be valid trigger information by the terminal, wherein all other first trigger information of the plurality of first trigger information is considered to be invalid trigger information by the terminal, wherein the target first trigger information is used by the terminal to determine sending processing of the first reference signal, and wherein the plurality of DCI are in a one-to-one correspondence with the plurality of first trigger information; and sending the at least one DCI to the terminal in response to determining the at least one DCI in the plurality of DCI.

21. The method according to claim 20, wherein the at least one DCI is determined in a predefined manner or in a manner of interaction with another network device serving the terminal.

* * * * *